US009325185B2

(12) United States Patent
Yang

(10) Patent No.: US 9,325,185 B2
(45) Date of Patent: Apr. 26, 2016

(54) CHARGING DEVICE APPLIED TO A PORTABLE MOBILE COMMUNICATION DEVICE

(71) Applicant: Wistron Corporation, New Taipei (TW)

(72) Inventor: Hung-Sen Yang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 231 days.

(21) Appl. No.: 13/916,576

(22) Filed: Jun. 13, 2013

(65) Prior Publication Data
US 2014/0125283 A1　May 8, 2014

(30) Foreign Application Priority Data
Nov. 2, 2012　(TW) ............................. 101140800 A

(51) Int. Cl.
*H02J 7/00*　(2006.01)
*H02J 7/02*　(2006.01)
(52) U.S. Cl.
CPC ............. *H02J 7/0044* (2013.01); *H02J 7/0045* (2013.01)
(58) Field of Classification Search
CPC ..................................................... H02J 7/0042
USPC .......................................... 320/107, 114, 101
See application file for complete search history.

(56) References Cited

U.S. PATENT DOCUMENTS

| 5,535,274 A | * | 7/1996 | Braitberg | H02J 7/0004 379/426 |
| 6,938,867 B2 | * | 9/2005 | Dirks | H02G 3/18 348/309.1 |

FOREIGN PATENT DOCUMENTS

TW　　311556　*　7/1997　............ H02J 7/0042

OTHER PUBLICATIONS

Office action mailed on Jun. 1, 2015 for the China application No. 201210490713.1, p. 3-6.

* cited by examiner

*Primary Examiner* — Edward Tso
*Assistant Examiner* — Ahmed Omar
(74) *Attorney, Agent, or Firm* — Winston Hsu; Scott Margo

(57) ABSTRACT

A charging device applied to a portable mobile communication device is disclosed in the present invention. The charging device includes a base, a supporter and a transmission module. The supporter and the transmission module are disposed on the base in a detachable manner. The transmission module includes a first connector, a second connector and a transmission cable. The first connector is disposed on an opening on the supporter for electrically connecting to a terminal of the portable mobile communication device. The second connector disposed inside an accommodating structure of the base for electrically connecting to an external electronic device. Two ends of the transmission cable are respectively connected to the first connector and the second connector, so that the external electronic device and the portable mobile communication device can transmit electric power via the transmission module.

17 Claims, 17 Drawing Sheets

CHARGING DEVICE APPLIED TO A PORTABLE MOBILE COMMUNICATION DEVICE

BACKGROUND OF THE INVENTION

1. Field of the Invention

The present invention relates to a charging device, and more particularly, to a charging device capable of applying to the portable mobile communication devices with different shapes and specifications.

2. Description of the Prior Art

With the advanced technology, the portable mobile communication device becomes a short-term entertainment product. The portable mobile communication devices manufactured by the same company and different companies may have different shapes, so that the charging device is designed according to the matched portable mobile communication device. It is to say, the consumer has to buy the matched charging device when the consumer gets a new-type portable mobile communication device, and expense of the purchase cost is increased. Thus, design of a charging device capable of applying to the portable mobile communication devices with different styles is an important issue of the mechanical industry.

SUMMARY OF THE INVENTION

The present invention provides a charging device capable of applying to the portable mobile communication devices with different shapes and specifications for solving above drawbacks.

According to the claimed invention, a charging device applied to a portable mobile communication device is disclosed. The portable mobile communication device has a connecting interface. The charging device includes a base, a supporter and a transmission module. The base includes an accommodating structure. The supporter is detachably disposed on the base. The portable mobile communication device is held by the supporter. The transmission module is optionally detachably combined with the accommodating structure of the base to be electrically connected to the portable mobile communication device, or separated from the base to be electrically connected to the portable mobile communication device directly and individually. The transmission module includes a first connector, a second connector and a transmission cable. The first connector can be fixed on the supporter. The first connector is for electrically connecting to the connecting interface of the portable mobile communication device. The second connector can be fixed inside the accommodating structure of the base. The second connector is for electrically connecting to an external power supply device or an electronic datum processing device. Two ends of the transmission cable are electrically connected to the first connector and the second connector respectively.

According to the claimed invention, the base further includes a first constraining structure, and the supporter includes a second constraining structure. The second constraining structure is slidably combined with the first constraining structure.

According to the claimed invention, the first constraining structure is a constraint protrusion, the second constraining structure is a constraint slot, and the constraint protrusion slidably inserts into the constraint slot.

According to the claimed invention, the base further includes a constraining plank whereon a constraint hole is formed. The first constraining structure is formed on the constraining plank. The supporter further includes a constraining baffle accordingly. The constraining baffle can buckle the constraining hole when the supporter is combined with the first constraining structure via the second constraining structure, so as to constrain a movement of the supporter relative to the base.

According to the claimed invention, the constraining baffle is a resilient unit, and an end of the resilient unit buckles the constraining hole.

According to the claimed invention, the base further includes a first restraining structure, the second connector includes a second restraining structure, and the second restraining structure is slidably combined with the first restraining structure.

According to the claimed invention, the first restraining structure is a restraint protrusion, the second restraining structure is a restraint slot, and the restraint protrusion slidably inserts into the restraint slot.

According to the claimed invention, the base further includes a restraint hole formed on an inner wall of the accommodating structure. The second connector further includes a restraining plank. An end of the restraining plank buckles the restraining hole in a resiliently oscillatory manner to restrain a movement of the second connector relative to the base.

According to the claimed invention, the charging device further includes a fixing component detachably disposed between the first connector and the supporter. The fixing component fixes and constrains a movement of the first connector relative to the supporter.

According to the claimed invention, the first connector includes a first engaging structure. The supporter includes a second engaging structure. The fixing component slidably inserts into the first engaging structure and the second engaging structure.

According to the claimed invention, the fixing component is an engaging protrusion, the first engaging structure and the second engaging structure respectively are engaging slots, two ends of the engaging protrusion slidably insert into the engaging slots respectively.

According to the claimed invention, the fixing component includes a resilient arm. The supporter further includes a contacting portion. An end of the resilient arm buckles the contacting portion to fix and constrain a movement of the fixing component relative to the supporter.

According to the claimed invention, the supporter includes a holding structure. A contour of the holding structure substantially corresponds to a shape of the portable mobile communication device.

According to the claimed invention, the base further includes a first opening structure and a second opening structure. The first opening structure is disposed on a side of the accommodating structure and adjacent to the supporter. The transmission cable pierces through the accommodating structure via the first opening structure. The second opening structure is disposed on the other side of the accommodating structure. The second connector is disposed on the second opening structure to be electrically connected to the external power supply device or the electronic datum processing device.

According to the claimed invention, the transmission module further includes a magnetic component disposed on the first connector. The first connector utilizes the magnetic component to connect to a magnetic unit disposed on the connecting interface of the portable mobile communication device.

According to the claimed invention, the transmission module further includes an auxiliary charging outputting connector. The base further includes an auxiliary charging inputting connector, a battery container, a charging terminal and a charging circuit board. The battery container is for containing a battery module. A part of the charging terminal is exposed out of a side of the battery container to be electrically connected to an electrode of the battery module. The charging circuit board is electrically connected to the auxiliary charging inputting connector and the charging terminal.

According to the claimed invention, an opening is formed on the supporter corresponding to the connecting interface of the portable mobile communication device, and the first connector of the transmission module can be fixed on the opening.

The charging device of the present invention includes the base, the supporter, the transmission module and the fixing component. The above-mentioned individual components can be detachably assembled with each other to form the charging device. The individual components include the universal constraining structures, the universal restraining structures and the engaging structures. The supporter with specific holding structure can be replaced according to user's demand. The selected supporter is installed on the base, so that the charging device of the present invention can be widespread applied to the portable mobile communication devices with different styles and similar style for charging function and datum transmission. The transmission module of the present invention can further be separated from the base and the supporter, to be electrically connected to the portable mobile communication device according actual demand. Therefore, the charging device of the present invention has advantages of easy assembly and operation convenience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
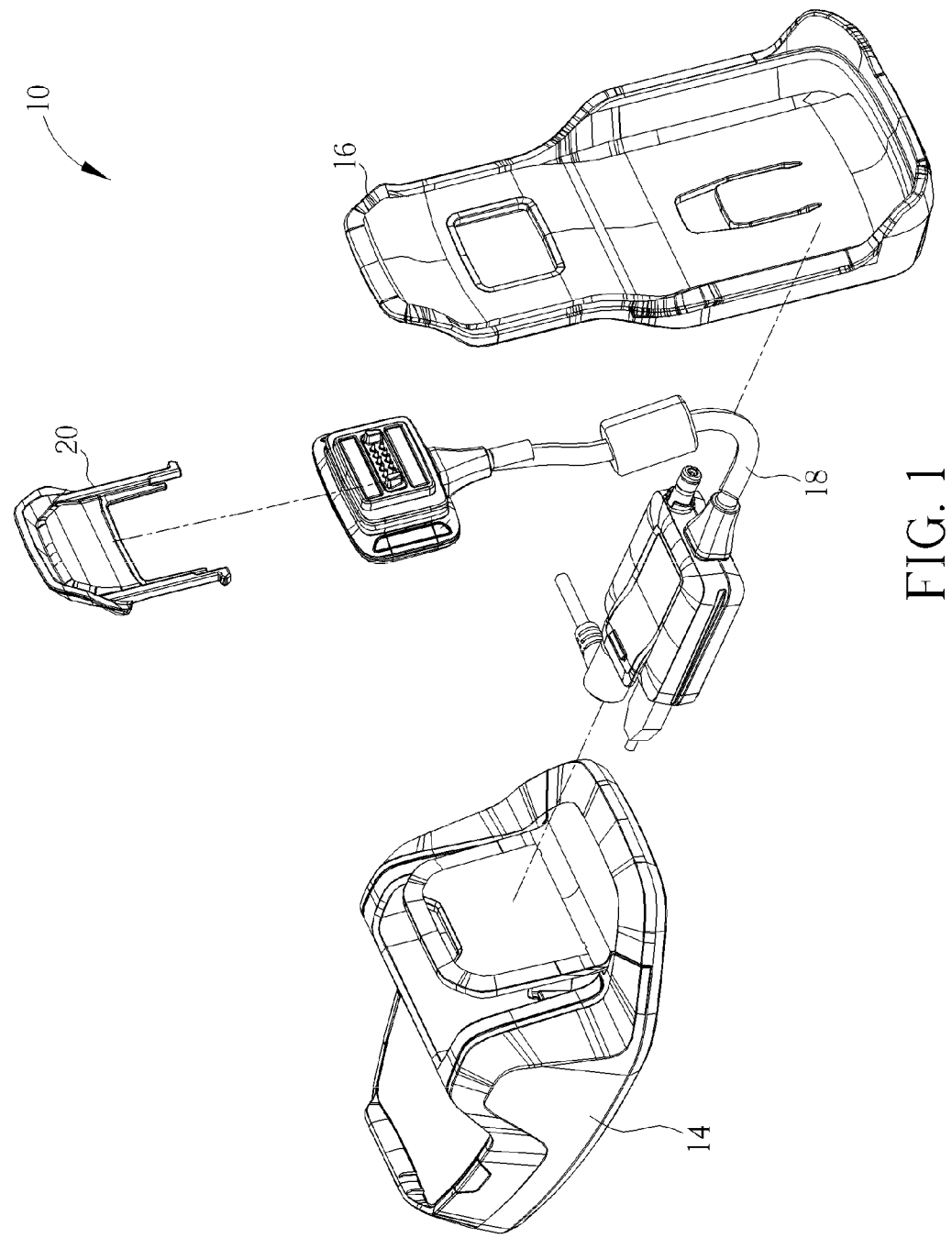
FIG. 1 is an exploded diagram of a charging device according to an embodiment of the present invention.
Figure 2:
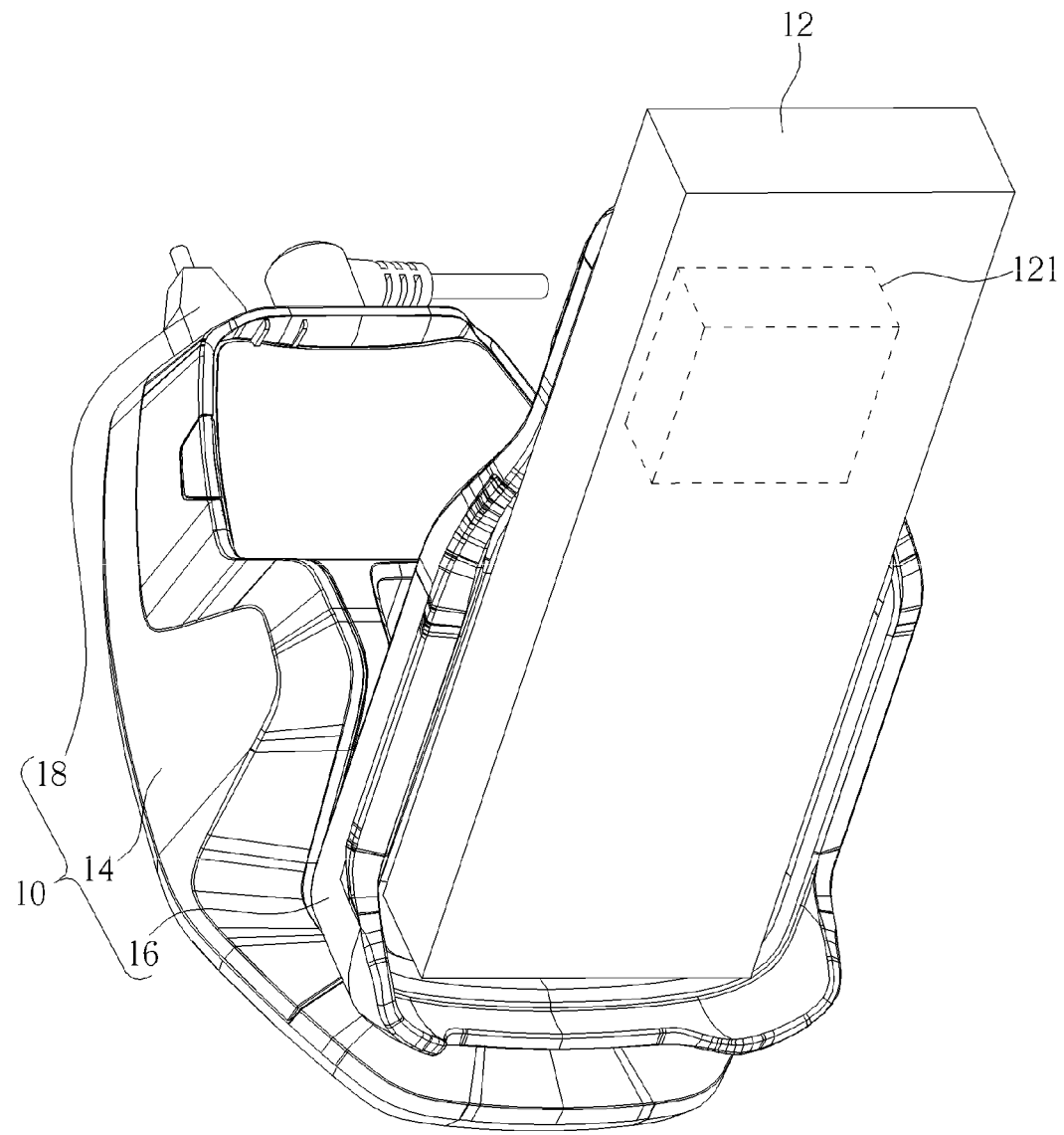
FIG. 2 is an assembly diagram of the charging device according to the embodiment of the present invention.

Please refer to FIG. 1 and FIG. 2. FIG. 1 is an exploded diagram of a charging device 10 according to an embodiment of the present invention. FIG. 2 is an assembly diagram of the charging device 10 according to the embodiment of the present invention. The charging device 10 can be a power supply or a datum transmission interface for a portable mobile communication device 12. The charging device 10 can be a supporting structure whereon the portable mobile communication device 12 is obliquely disposed, which means the charging device 10 is the desktop standing charger accordingly. The charging device 10 can further use the transmission cable to be electrically connected to a connecting interface 121 of the portable mobile communication device 12, which means the charging device 10 is the travel charger accordingly. The charging device 10 can selectively connect to the DC-in cable to transmit the DC current by AC power supply or any other power supply. The charging device 10 can further selectively connect to the USB cable to execute datum transmission via the electronic device, such as the computer. The charging device 10 can further simultaneously connect to the DC-in cable and the USB cable, as shown in FIG. 2.

The charging device 10 includes a base 14, a supporter 16, a transmission module 18 and a fixing component 20. The base 14 can be a counterweight block to prevent the charging device 10 from collapse when the portable mobile communication device 12 is put on the charging device 10. The transmission module 18 and the supporter 20 are detachably disposed on the base 14 in sequence, and the fixing component 20 can further be detachably disposed between the supporter 16 and the transmission module 18, so as to fix the transmission module 18. It should be mentioned that the supporter 16 of the present invention can be replaced according to shape and specifications of the portable mobile communication device 12. The present invention can be applied to the portable mobile communication device 12 with different shapes and different specification by replacement of the supporter 16, which corresponds to the shape and the specifications of the selected portable mobile communication device 12. The other components (such as the base 14, the transmission module 18 and the fixing component 20) of the charging device 10 can be continuously used for preferred economy.

Figure 3:
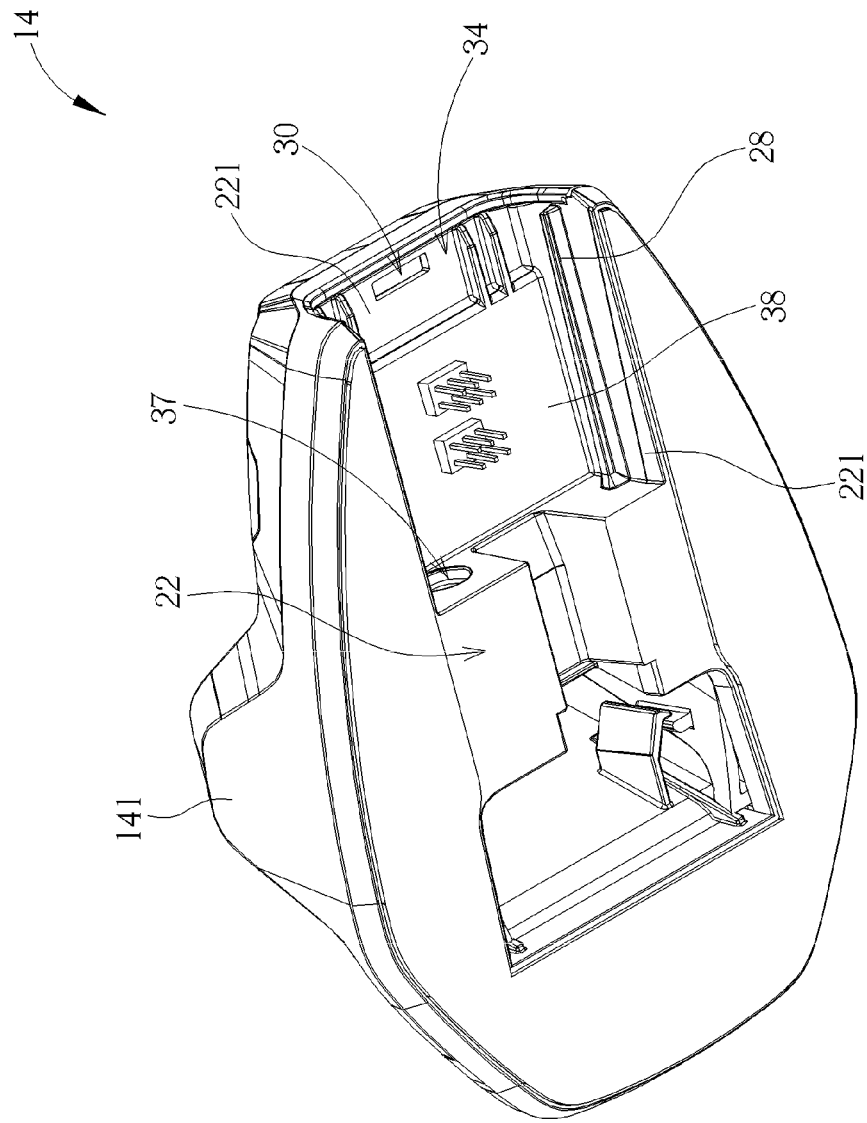
FIG. 3 and FIG. 4 respectively are diagrams of a base in different views according to the embodiment of the present invention.
Figure 4:
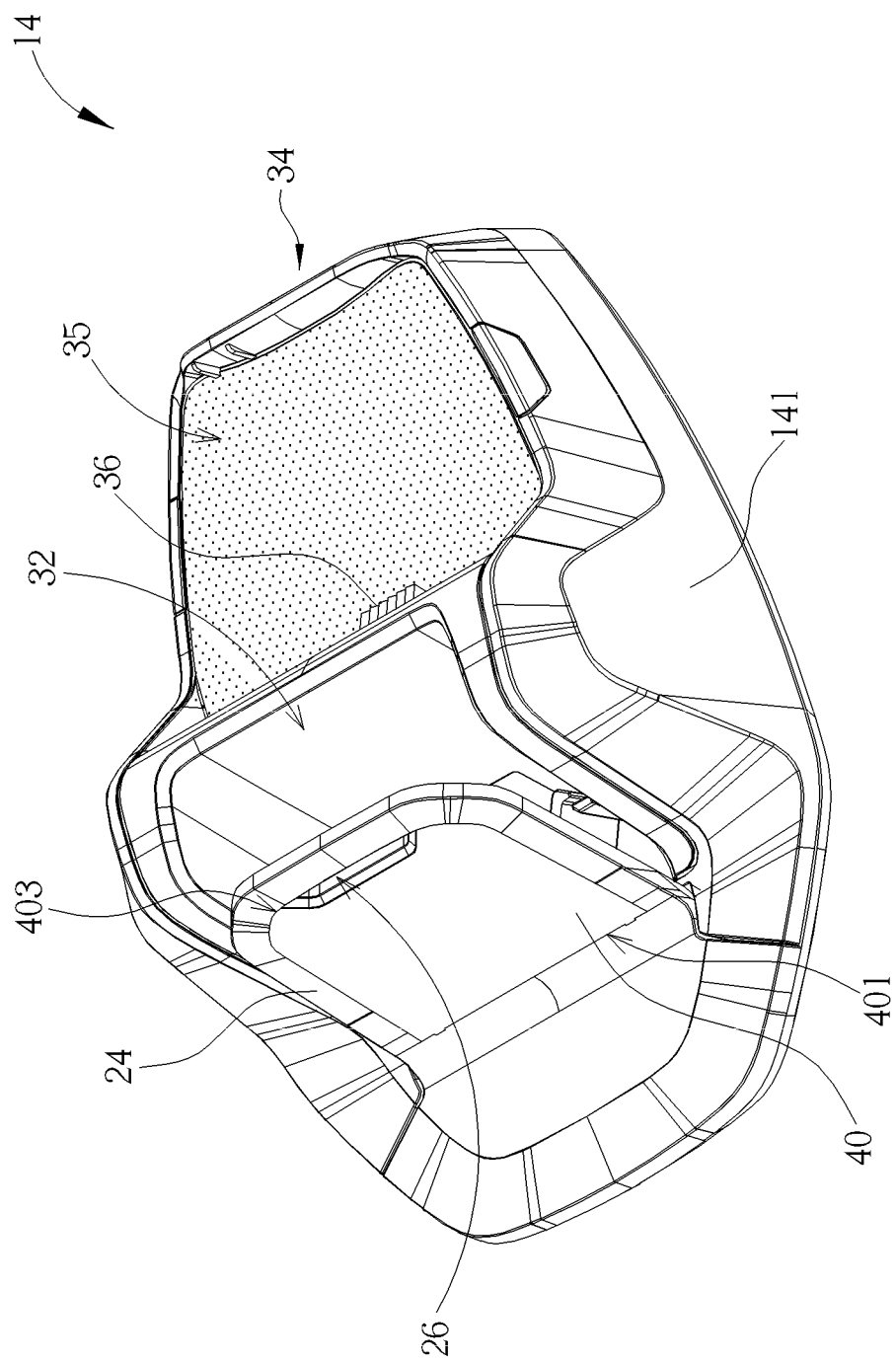

Please refer to FIG. 1, FIG. 3 and FIG. 4. FIG. 3 and FIG. 4 respectively are diagrams of the base 14 in different views according to the embodiment of the present invention. The base 14 includes an accommodating structure 22, a constraining plank 40, a first opening structure 32, a second opening structure 34, a battery container 35, a charging terminal 36, an auxiliary charging inputting connector 37 and a charging circuit board 38. The charging circuit board 38 is electrically connected to the auxiliary charging inputting connector 37 and the charging terminal 36. The accommodating structure 22 is disposed on a bottom of a body 141 of the base 14. The accommodating structure 22 includes the first opening structure 32 and the second opening structure 34 which connect to each other. The first opening structure 32 is adjacent to the supporter 16 and faces upwardly. The second opening structure 34 is close to a rear of the base 14 and faces backwardly. The transmission module 18 can pass into the accommodating structure 22 via the second opening structure 34, and protrude out of the first opening structure 32 to be accommodated inside base 14.

As shown in FIG. 3 and FIG. 4, the constraining plank 40 is formed on a side of the first opening structure 32. The constraining plank 40 can be a tongue structure, which includes a fixing portion 401 and a free portion 403. A constraint hole 26 is formed on the free portion 403, and a first constraining structure 24 is disposed on an edge of the free end 403. The supporter 16 can be disposed on the constraining plank 40, and stably installed on the base 14 via a combination of the first constraining structure 24 and the constraint hole 26. In addition, the accommodating structure 22 further includes a first restraining structure 28 and a restraint hole 30 respectively formed on different inner walls 221 of the second opening structure 34. As shown in FIG. 3, the first restraining structure 28 is disposed on the lateral inner wall 221, the restraint hole 30 is formed on the upper inner wall 221, and the first restraining structure 28 can be a guide track. The transmission module 18 can be stably installed on the base 14 by a combination of the first restraining structure 28 and the restraint hole 30 when the transmission module 18 passes through the accommodating structure 22.

Figure 6:
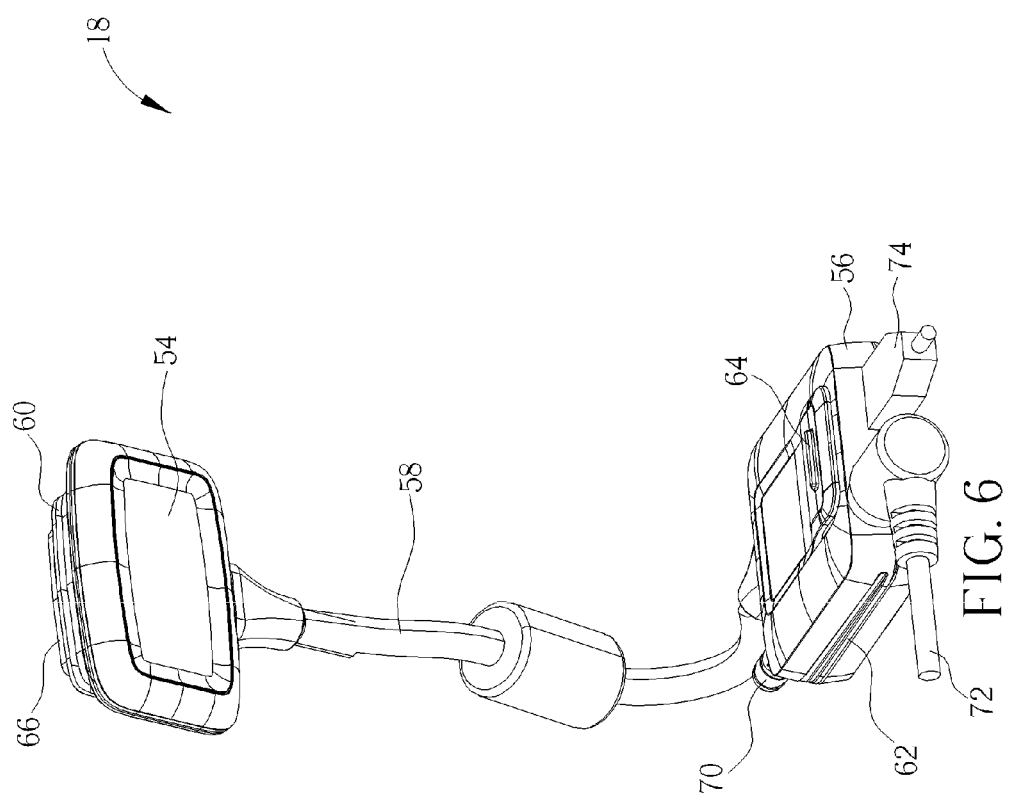
FIG. 6 is a diagram of a transmission module in the other view according to the embodiment of the present invention.

Besides, the charging terminal 36, the auxiliary charging inputting connector 37 and the charging circuit board 38 are selective components. The charging terminal 36 can be disposed on a side of the battery container 35 of the body 141, and a part of the charging terminal 36 is exposed. The charging circuit board 38 is electrically connected to the charging terminal 36 and the auxiliary charging inputting connector 37. As the transmission module 18 passes through the accommodating structure 22, an auxiliary charging outputting connector 70 (as shown in FIG. 6) of the transmission module 18 can insert into the auxiliary charging inputting connector 37 to transmit electric power to the charging circuit board 38 and the charging terminal 36. Thus, a built-in battery module (or the other battery module with conform specification) of the portable mobile communication device 12 can be individually put on the battery container 35 and the charging electrode of the built-in battery module contacts the charging terminal 36, so the transmission module 18 not only can transmit the electric power to the portable mobile communication device 12, but also can charge the built-in battery module simultaneously.

Figure 5:
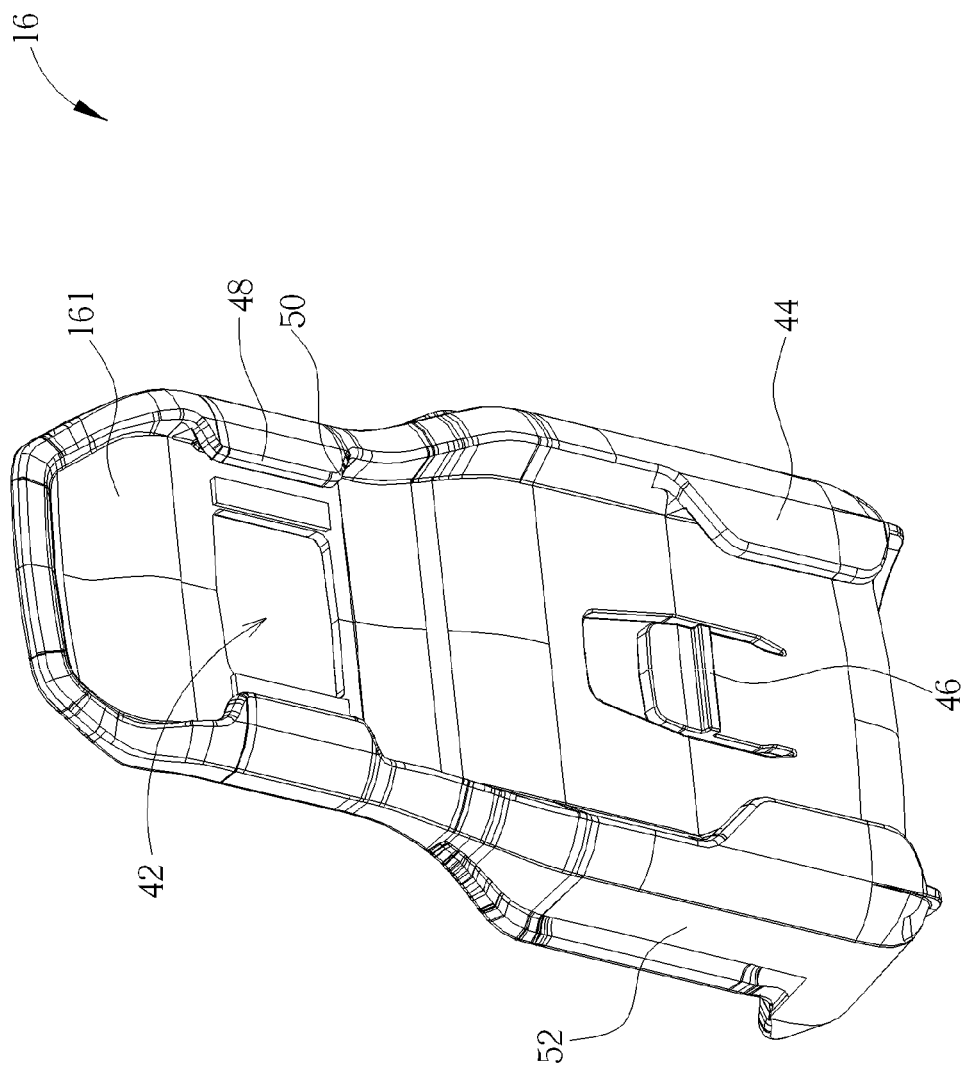
FIG. 5 is a diagram of a supporter in the other view according to the embodiment of the present invention.

Please refer to FIG. 1 and FIG. 5. FIG. 5 is a diagram of the supporter 16 in the other view according to the embodiment of the present invention. The supporter 16 includes an opening 42, a second constraining structure 44, a constraining baffle 46, a second engaging structure 48, a contacting portion 50 and a holding structure 52. The opening 42 is formed on the body 161 of the supporter 16 and corresponds to the connecting interface 121 of the portable mobile communication device 12. The first connector 54 of the transmission module 18 (as shown in FIG. 6) can be wedged inside the opening 42. The second constraining structure 44 is disposed on a back of the body 161. The constraining baffle 46 can be disposed on the body 161 in a resiliently oscillatory manner. When the supporter 16 is installed on the base 14, the second constraining structure 44 can be slidably combined with the first constraining structure 24, and the constraining baffle 46 can buckle the constraint hole 26, so as to effectively constrain a movement of the supporter 16 relative to the base 14.

In addition, the second engaging structure 48 can be disposed on the body 161 adjacent to the opening 42. The contacting portion 50 can be disposed on the body 161 adjacent to the second engaging structure 48. As shown in FIG. 5, the contacting portion 50 can be a bottom of the second engaging structure 48. The first connector 54 of the transmission module 18 (as shown in FIG. 6) can be fixed on the supporter 16 by the second engaging structure 48 and the contacting portion 50. The holding structure 52 can be disposed on a front of the body 161 for holding the portable mobile communication device 12, and a contour of the holding structure 52 can substantially correspond to a shape of the portable mobile communication device 12. The supporter 16 is a replaceable component, the charging device 10 of the present invention can be widespread applied to the portable mobile communication device 12 with different styles, so that the user can choose the supporter 16 with the holding structure 52 suitable for the selected style of the portable mobile communication device 12, and install the supporter 16 on the base 14 to assemble the charging device 10.

Please refer to FIG. 1 and FIG. 6. FIG. 6 is a diagram of the transmission module 18 in the other view according to the embodiment of the present invention. The transmission module 18 includes the first connector 54, a second connector 56 and a transmission cable 58. Two ends of the transmission cable 58 are respectively connected to the first connector 54 and the second connector 56. The first connector 54 can be wedged inside the opening 42 of the supporter 16, so as to be electrically connected to the connecting interface 121 of the portable mobile communication device 12. The second connector 56 can be disposed inside the accommodating structure 22 of the base 14 to be electrically connected to a power cable 72 or a datum transmission cable 74. Therefore, the portable mobile communication device 12 can be charged or transmit datum via the transmission module 18.

The first connector 54 can include a first engaging structure 60 for fixing a movement of the fixing component 20 relative to the second engaging structure 48. The second connector 56 can include a second restraining structure 62 and a restraining plank 64. The second restraining structure 62 can be a guide slot, which is slidably combined with the first restraining structure 28 of the base 14. An end of the restraining plank 64 buckles the restraint hole 30 of the base 14 in a resiliently oscillatory manner, so as to restrain a movement of the second connector 56 relative to the base 14. The transmission module 18 can further include a magnetic component 66 disposed on the first connector 54. The first connector 54 can utilize a magnetic attractive force of the magnetic component 66 to connect to the connecting interface 121 of the portable mobile communication device 12. It is to say, the first connector 54 of the transmission module 18 can directly contact the connecting interface 121 of the portable mobile communication device 12 by the magnetic component 66 (a magnetic unit is disposed on the connecting interface 121 accordingly, and the magnetic unit can be an iron block or a magnet) when the base 14 and the supporter 16 of the portable mobile communication device 12 are unnecessary. The combination of the first engaging structure 60, the second engaging structure 48 and the fixing component 20 can be omitted for the other type of the datum transmission tool, which means the charging device 10 can be switched to the travel charger.

Figure 7:
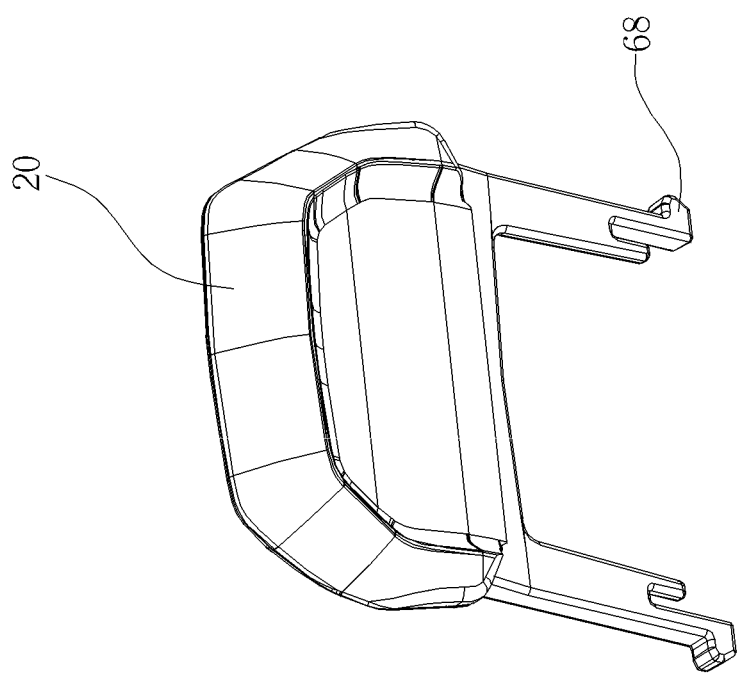
FIG. 7 is a diagram of a fixing component in the other view according to the embodiment of the present invention.

Please refer to FIG. 1 and FIG. 7. FIG. 7 is a diagram of the fixing component 20 in the other view according to the embodiment of the present invention. The fixing component 20 is detachably disposed between the first connector 54 and the supporter 16. When the first connector 54 is wedged with the opening 42, the fixing component 20 can slidably insert into a gap between the first engaging structure 60 and the second engaging structure 48 to constrain a movement of the first connector 54 relative to the supporter 16. The fixing component 20 can include a resilient arm 68. An end of the resilient arm 68 can buckle the contacting portion 50 to constrain a movement of the fixing component 20 relative to the supporter 16.

The charging device 10 of the present invention can include four detachable components, such as the base 14, the supporter 16, the transmission module 18 and the fixing component 20. The supporter 16 is designed according to customer demand, and the supporter 16 is selected due to style of the portable mobile communication device 12. The opening 42 and the holding structure 52 of the supporter 16 are designed according to the shape of the portable mobile communication device 12, and the constraining structures, the engaging structures and the contacting structure of the supporter 16 are universal design, so that the supporter 16 can be assembled with the base 14, the transmission module 18 and the fixing component 20 rapidly to form the charging device 10.

Assembly procedures of the charging device 10 of the present invention are introduced as following description. First, the transmission module 18 passes through the accommodating structure 22 of the base 14. The first connector 54 and the transmission cable 58 can move out of the accommodating structure 22 via the first opening structure 32. The second connector 56 is installed inside the accommodating structure 22 to be fixed on the second opening structure 34, and two ends of the transmission module 18 can be electrically connected to the power supply device, the computer and the portable mobile communication device 12 according to user's demand. Then, the supporter 16 can be disposed on the base 14 via the combination of the first constraining structure 24, the second constraining structure 44, the constraint hole 26 and the constraining baffle 46. Final, the first connector 54 is wedged inside the opening 42, the fixing component 20 inserts into the gap between the first connector 54 and the supporter 16 to constrain the relative movement, so as to finish the assembly of the charging device 10.

Figure 8:
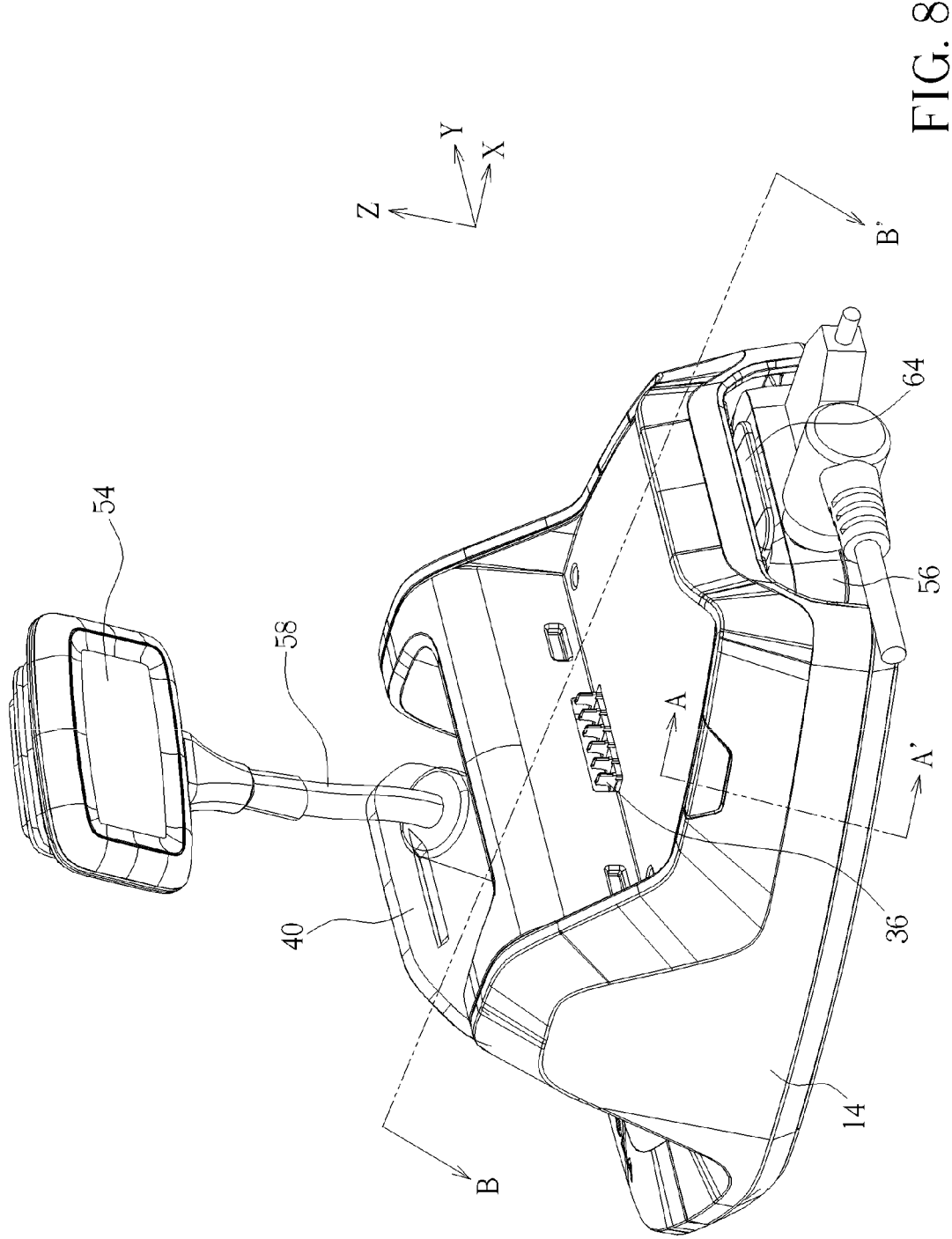
FIG. 8 is an assembly diagram of the base and the transmission module 18 according to the embodiment of the present invention.
Figure 9:
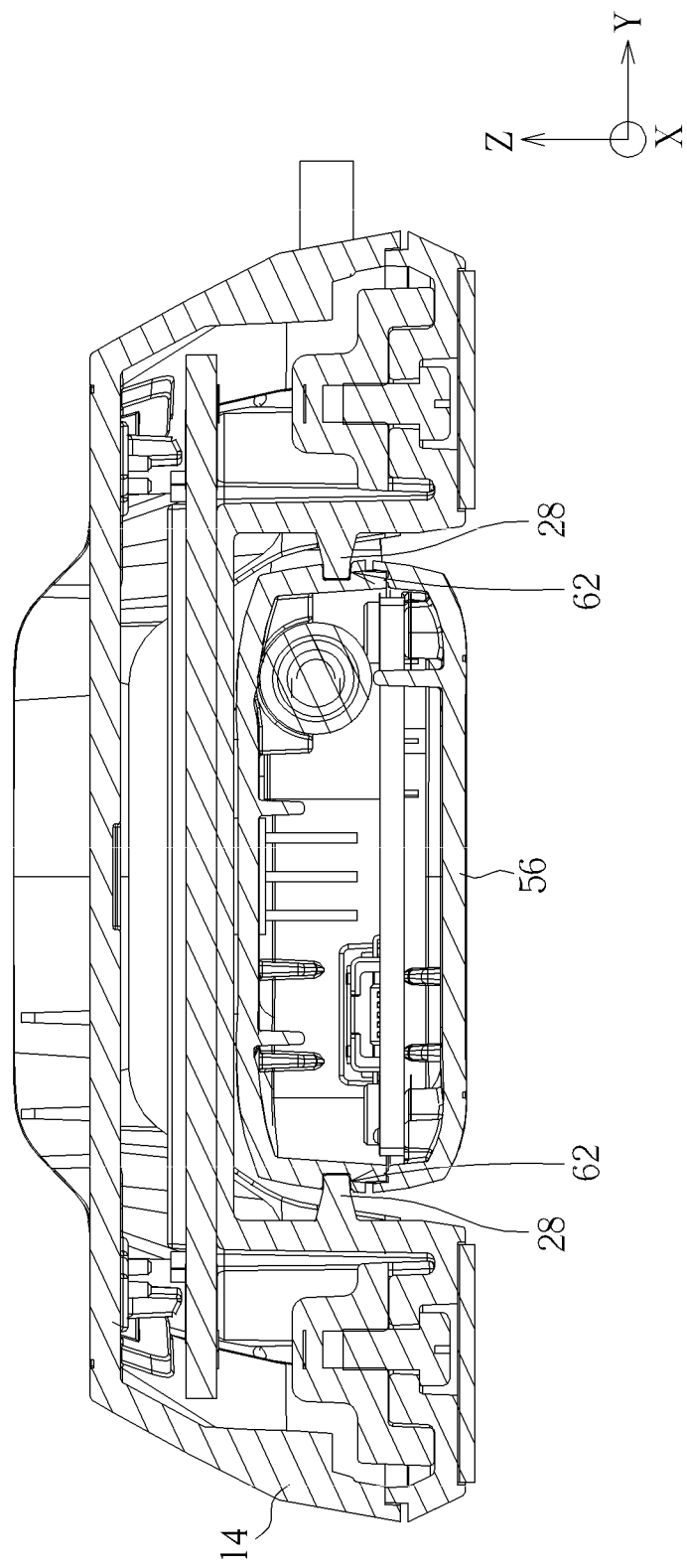
FIG. 9 is a sectional view in FIG. 8.
Figure 10:
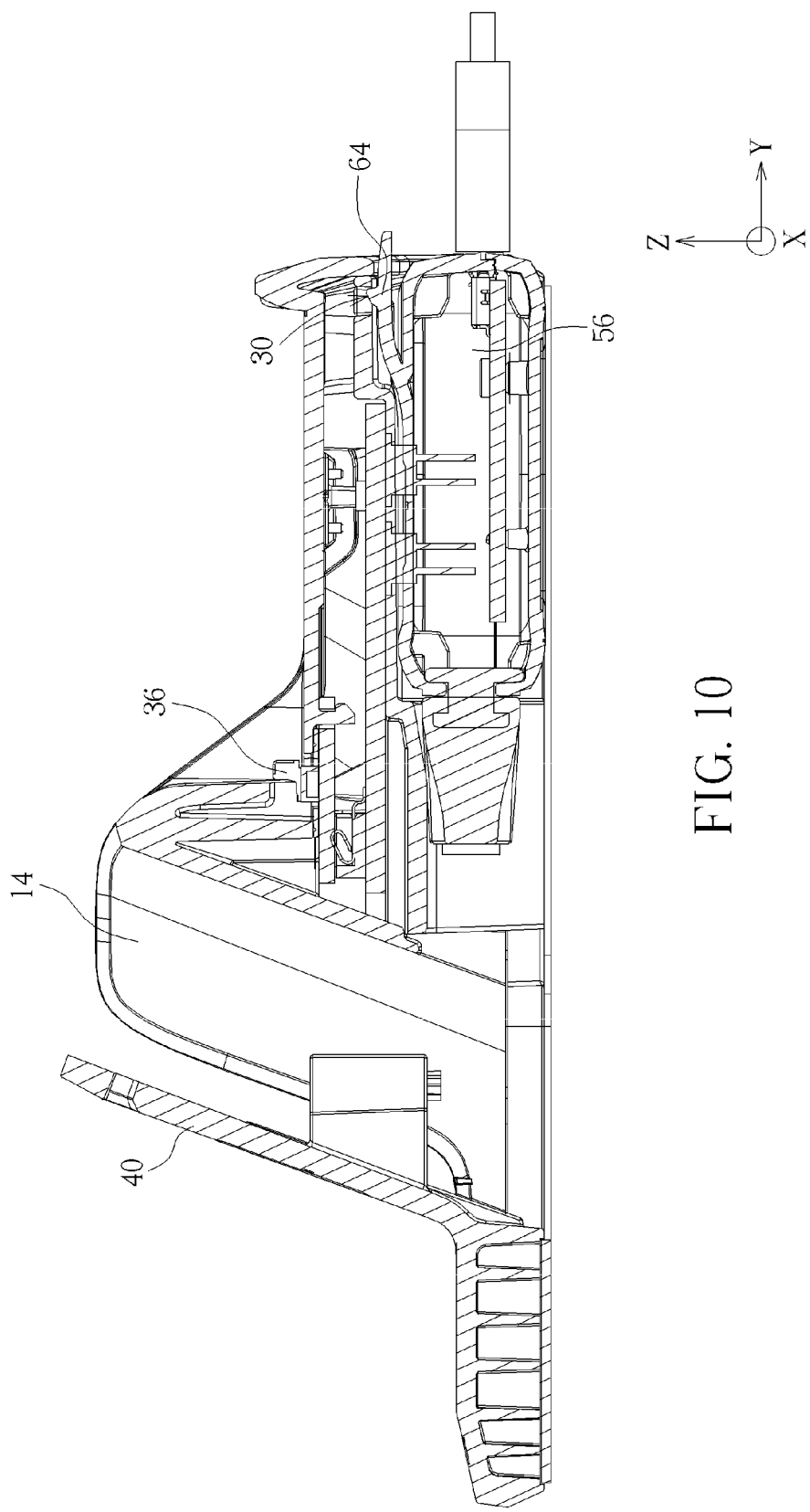
FIG. 10 is the other sectional view in FIG. 8.

Please refer to FIG. 1 and FIG. 8 to FIG. 10. FIG. 8 is an assembly diagram of the base 14 and the transmission module 18 according to the embodiment of the present invention. FIG. 9 is a sectional view taken along line A-A' in FIG. 8. FIG. 10 is a sectional view taken along line B-B' in FIG. 8. When the transmission module 18 is disposed inside the base 14, the second restraining structure 62 can be slidably combined with the first restraining structure 28. For example, the second restraining structure 62 can be a restraint slot, the first restraining structure 28 can be a restraint protrusion, and the restraint protrusion slidably inserts into the restraint slot, as shown in FIG. 9, so as to restrain a movement of the transmission module 18 relative to the base 14 along Y-axis and Z-axis.

The restraining plank 64 can buckle the restraint hole 30 in a resiliently oscillatory manner, as shown in FIG. 10, to restrain a movement of the transmission module 18 relative to the base 14 along X-axis, so the second connector 56 of the transmission module 18 can be stably disposed inside the accommodating structure 22. The base 14 and the second connector 56 can respectively include two first restraining structures 28 and two second restraining structures 62, which are respectively disposed on two sides of the main structure. Application of the restraining structures is not limited to the above-mentioned embodiment, and depends on design demand.

Figure 11:
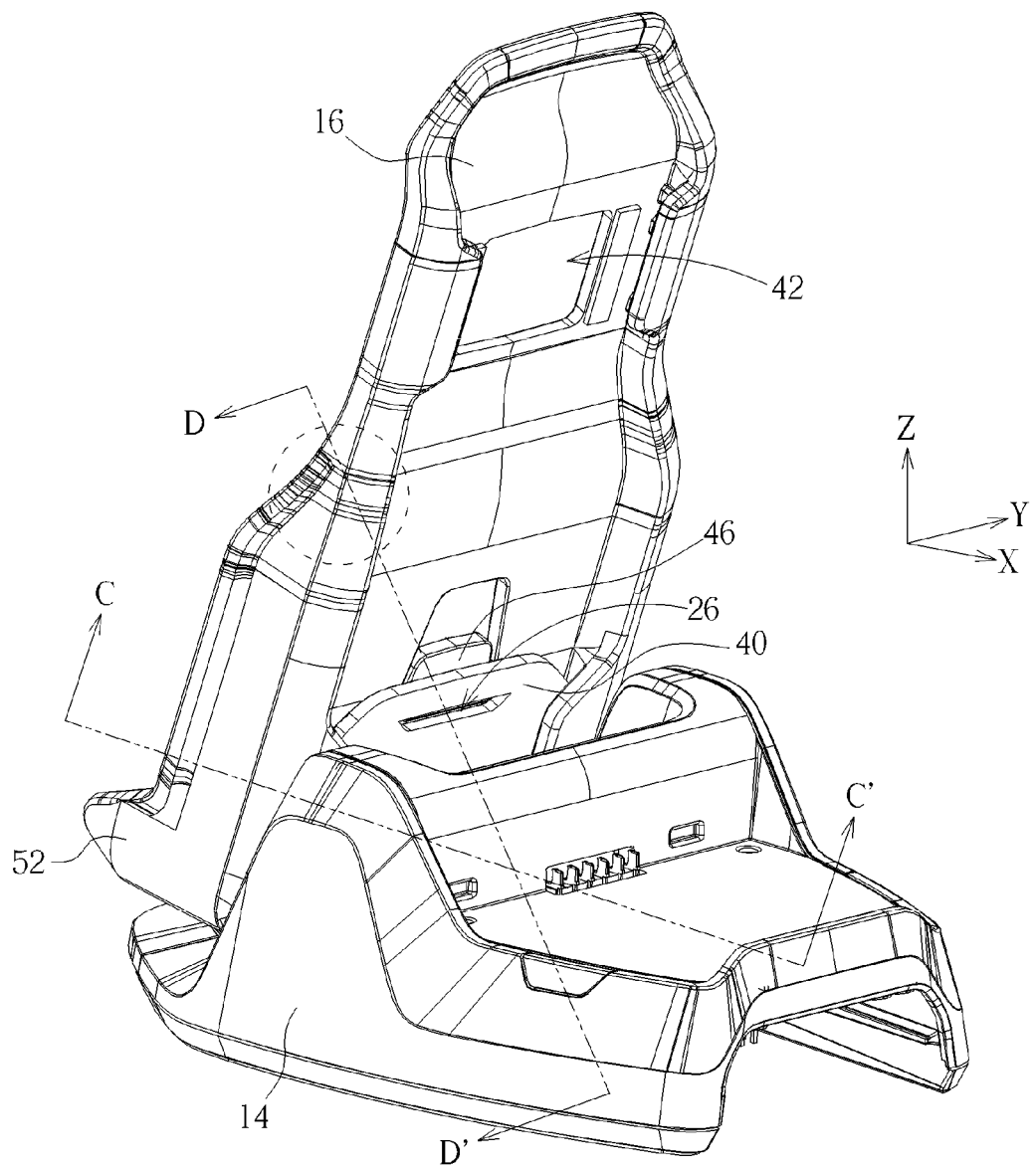
FIG. 11 is an assembly of the base and the supporter according to the embodiment of the present invention.
Figure 12:
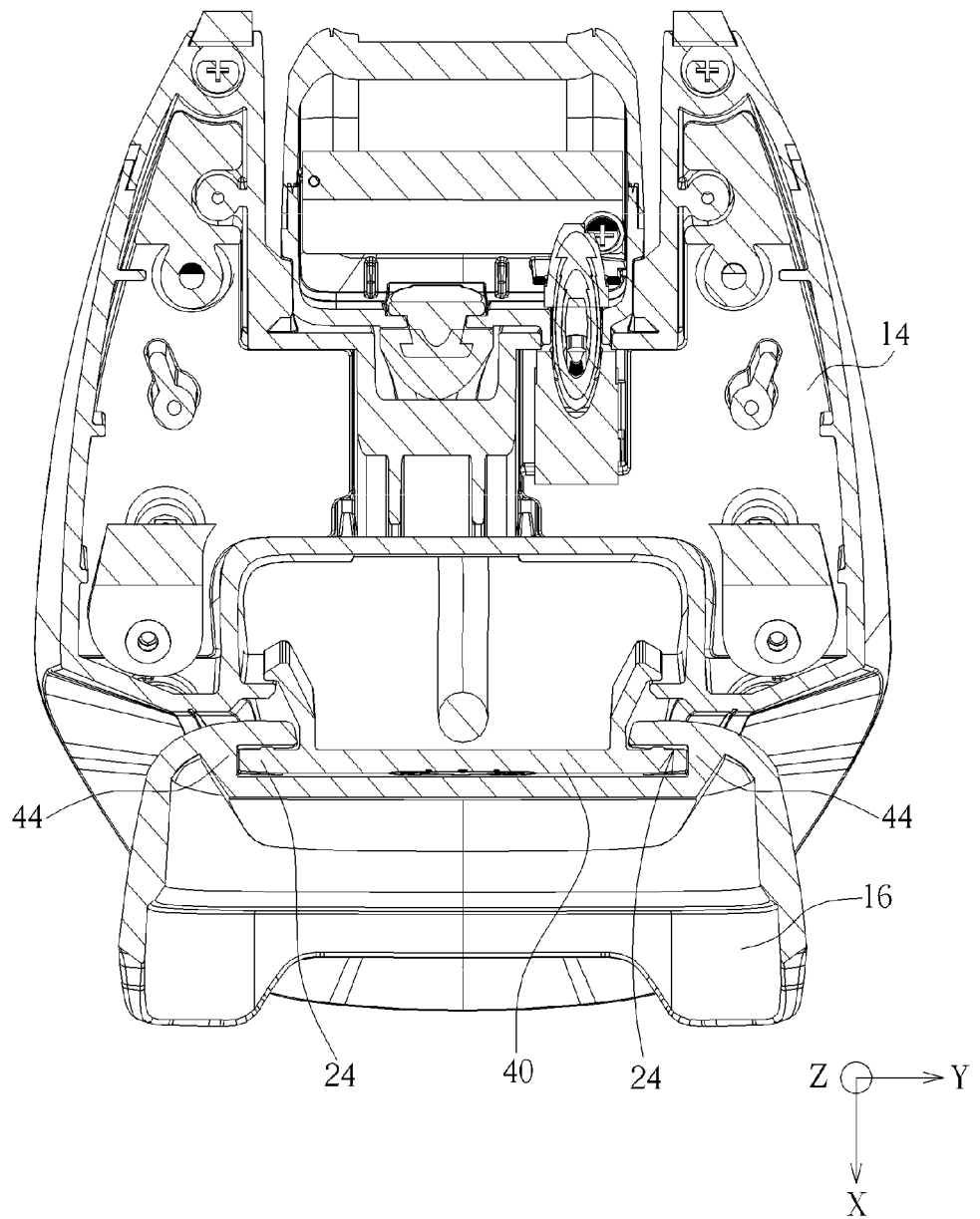
FIG. 12 is a sectional view in FIG. 11.
Figure 13:
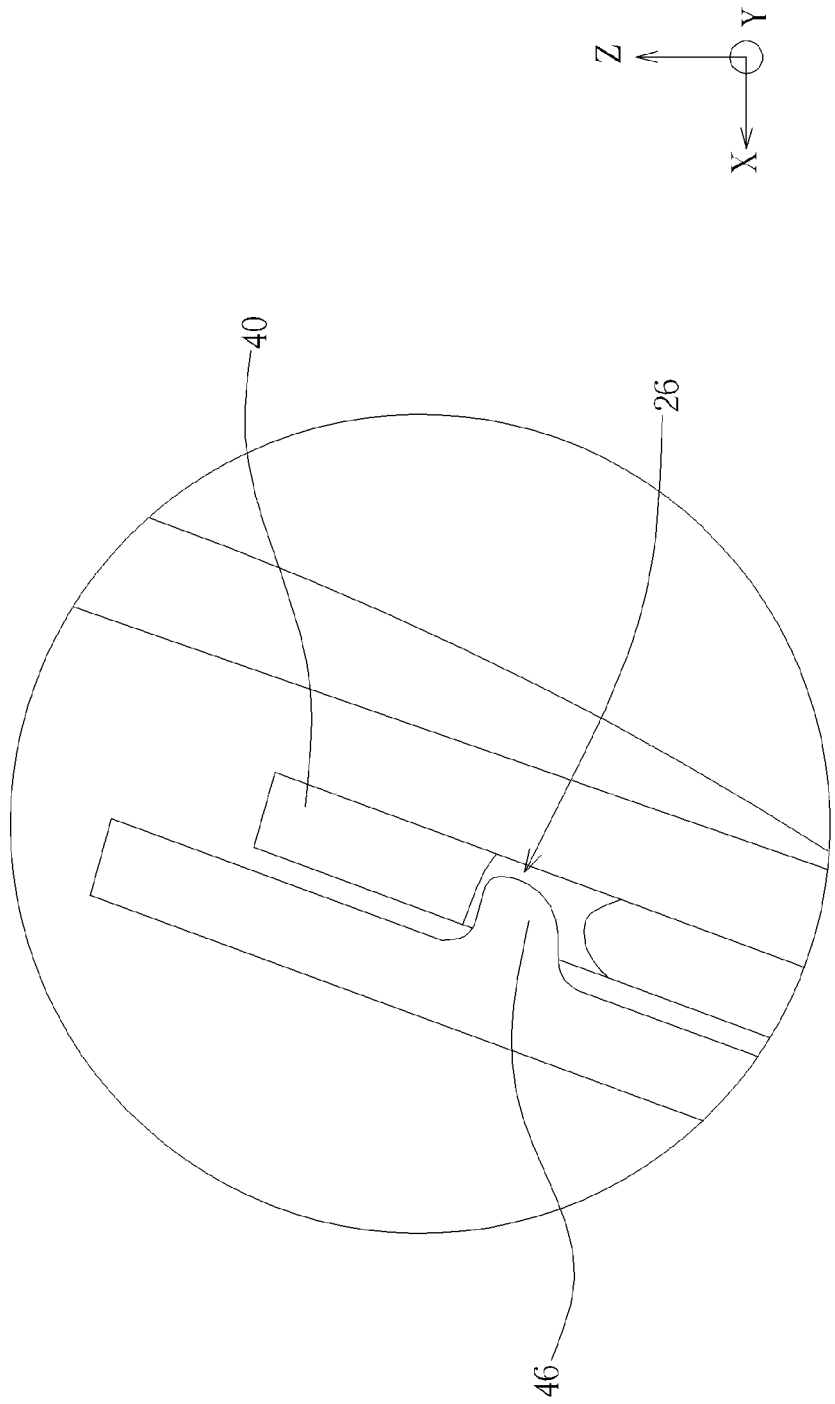
FIG. 13 is the other sectional view in FIG. 11.

Please refer to FIG. 1 and FIG. 11 to FIG. 13. FIG. 11 is an assembly of the base 14 and the supporter 16 according to the embodiment of the present invention. FIG. 12 is a sectional view taken along line C-C' in FIG. 11. FIG. 13 is a sectional view taken along line D-D' in FIG. 11. After the assembly of the transmission module 18 and the base 14, the second constraining structure 44 of the supporter 16 can be disposed on the constraining plank 40 to combine the supporter 16 with the base 14. For example, the first constraining structure 24 can be a constraint protrusion, the second constraining structure 44 can be a constraint slot, and the constraint protrusion slidably inserts into the constraint slot, as shown in FIG. 12, so as to constrain a movement of the supporter 16 relative to the base 14 along X-axis and Y-axis.

The constraining baffle 46 can be a resilient unit. An end of the resilient unit, which has the protrusion, can buckle the constraint hole 26 on the constraining plank 40, as shown in FIG. 13, to constrain a movement of the supporter 16 relative to the base 14 along Z-axis. The base 14 and the supporter 26 can respectively include two first constraining structures 24 and two second constraining structures 44, which are respectively disposed on two sides of the main structure. Application of the constraining structures is not limited to the above-mentioned embodiment, and depends on design demand.

Figure 14:
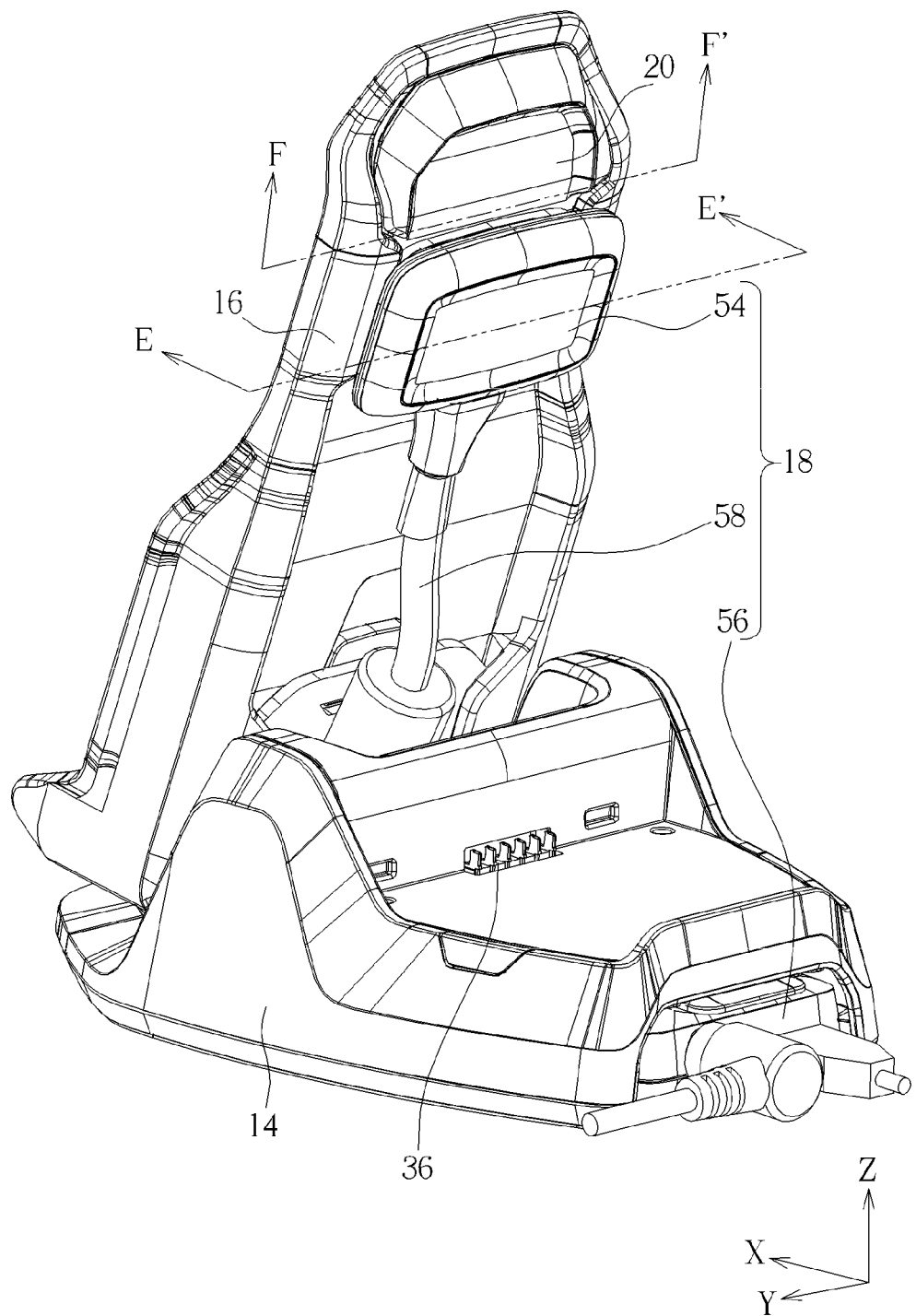
FIG. 14 is an assembly diagram of the fixing component, the supporter and the transmission module according to the embodiment of the present invention.
Figure 15:
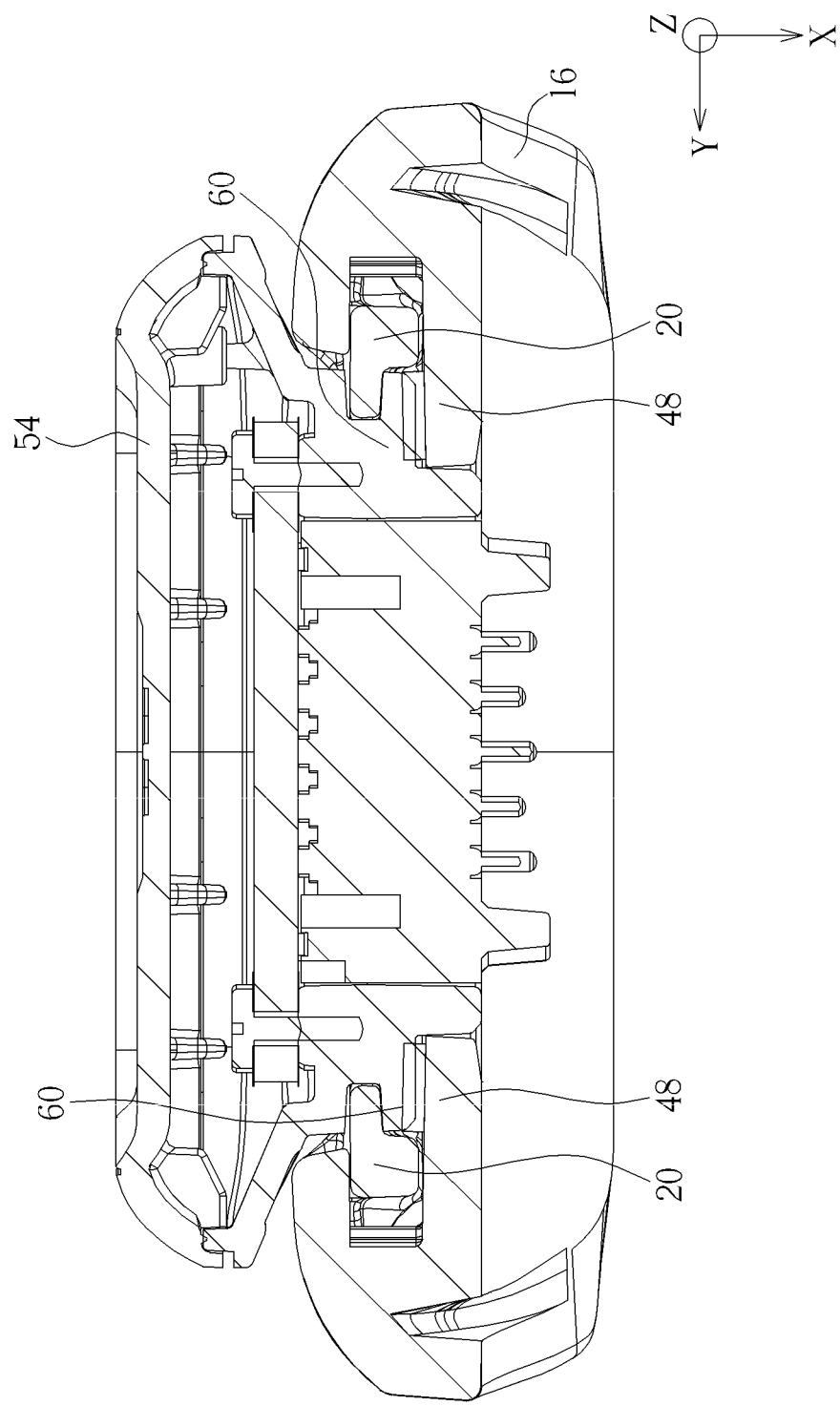
FIG. 15 is a sectional view in FIG. 14.
Figure 16:
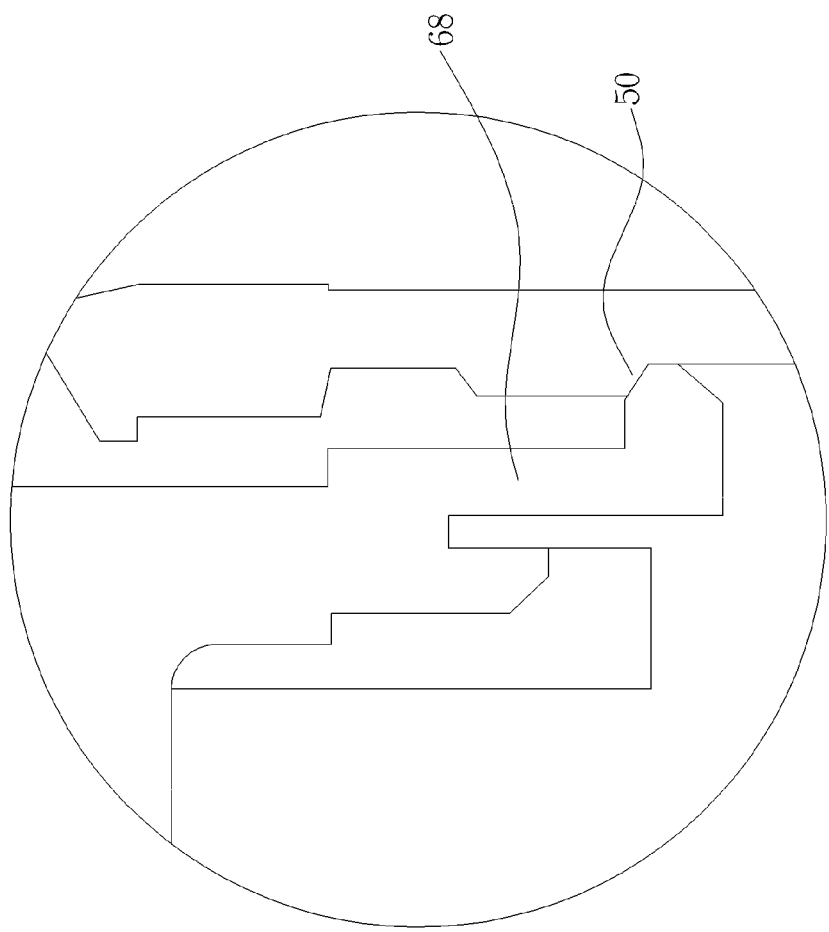
FIG. 16 is the other sectional view in FIG. 14.

Please refer to FIG. 1 and FIG. 14 to FIG. 16. FIG. 14 is an assembly diagram of the fixing component 20, the supporter 16 and the transmission module 18 according to the embodiment of the present invention. FIG. 15 is a sectional view taken along line E-E' in FIG. 14. FIG. 16 is a sectional view taken along line F-F' in FIG. 14. After the supporter 26 is fixed on the base 14 and the first connector 54 is wedged inside the opening 42, the fixing component 20 can insert into the gap between the first connector 54 and the supporter 26. For example, the fixing component 20 can be a L-shaped engaging protrusion, the first engaging structure 60 and the second engaging structure 48 can respectively be engaging slots, two ends of the L-shaped engaging protrusion slidably insert into the engaging slots respectively, as shown in FIG. 15, to constrain a movement of the first connector 54 relative to the supporter 26 along X-axis and Y-axis.

Besides, resilient arm 68 of the fixing component 20 can buckle the contacting portion 50 (which means the bottom of the second engaging structure 48), as shown in FIG. 16, to constrain a movement of the first connector 54 relative to the supporter 26 along Z-axis. Therefore, two connectors of the transmission module 18 can be respectively fixed on the supporter 16 and the base 14, the charging device 10 of the present invention can be utilized to charge the portable mobile communication device 12 or to execute the data transmission between the charging device 10 and the portable mobile communication device 12. The first connector 54 and the supporter 26 can respectively include two first engaging structures 60 and two second engaging structures 48, which are respectively disposed on two sides of the main structure. Application of the engaging structures is not limited to the above-mentioned embodiment, and depends on design demand.

In conclusion, the charging device 10 of the present invention can include four individual components, and the individual components can be assembled with each other detachably. The base 14, the transmission module 18 and the fixing component 20 are the universal components, and the supporter 16 is the customized component. The user can select the supporter 16 according to the style of the portable mobile communication device 12, and then assemble the supporter 16 with the base 14, the transmission module 18 and the fixing component 20 in sequence to obtain the applicable charging device 10. Thus, design cost and manufacturing cost of the present invention can be effectively decreased by replacement of the supporter 16, so as to be suitable for different shapes of the portable mobile communication device 12.

Figure 17:
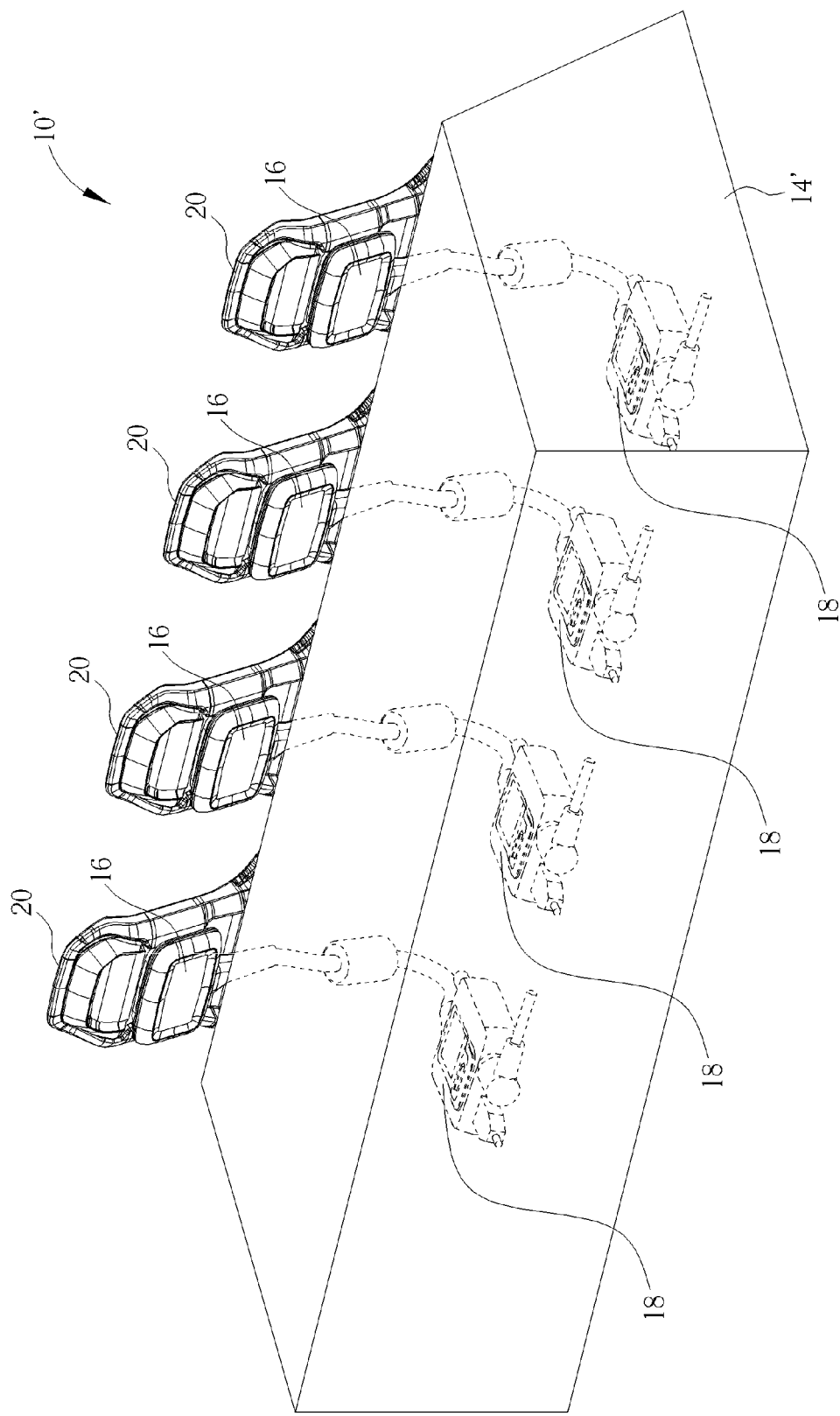
FIG. 17 is a diagram of the charging device according to the other embodiment of the present invention.

Furthermore, the charging device of the present invention can be simultaneously applied to a plurality of portable mobile communication devices. Please refer to FIG. 17. FIG. 17 is a diagram of the charging device 10' according to the other embodiment of the present invention. The charging device 10' can include the base 14', the supporters 16, the transmission modules 18 and the fixing components 20. The base 14' includes a plurality of constraining structures and restraining structures, and volume of the base 14' is substantially greater than volume of the base 14. The supporters 16 can be disposed on the base 14' in an equidistant arrangement manner. Each transmission module 18 is disposed between the base 14' and the corresponding supporter 16. The transmission modules 18 are electrically connected to the built-in power supply (not shown in figures). Assembly procedure of the individual components of the charging device 10' is illustrated as the above-mentioned embodiment, and detailed description is omitted herein for simplicity. The charging device 10' of the present invention can be simultaneously applied to the portable mobile communication devices 12 with different styles and similar style by dimensional adjustment of the base 14' and replacement of the supporters 16.

Comparing to the prior art, the charging device of the present invention includes the base, the supporter, the transmission module and the fixing component. The above-mentioned individual components can be detachably assembled with each other to form the charging device. The individual components include the universal constraining structures, the universal restraining structures and the engaging structures. The supporter with specific holding structure can be replaced according to user's demand. The selected supporter is installed on the base, so that the charging device of the present invention can be widespread applied to the portable mobile communication devices with different styles and similar style for charging function and datum transmission. The transmission module of the present invention can further be separated from the base and the supporter, to be electrically connected to the portable mobile communication device according actual demand. Therefore, the charging device of the present invention has advantages of easy assembly and operation convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging device applied to a portable mobile communication device, the portable mobile communication device having a connecting interface, the charging device comprising:
   a base, the base comprising an accommodating structure;
   a supporter detachably disposed on the base, the portable mobile communication device being held by the supporter; and
   a transmission module, the transmission module being optionally detachably combined with the accommodating structure of the base to be electrically connected to the portable mobile communication device, or separated from the base and the supporter to be electrically connected to the portable mobile communication device directly and individually, the transmission module comprising:
      a first connector capable of being fixed on the supporter, the first connector being for electrically connecting to the connecting interface of the portable mobile communication device;
      a second connector capable of being fixed inside the accommodating structure of the base, the second connector being for electrically connecting to an external power supply device or an electronic datum processing device; and
      a transmission cable, two ends of the transmission cable being electrically connected to the first connector and the second connector respectively.

2. The charging device of claim 1, wherein the base further comprises a first constraining structure, the supporter comprises a second constraining structure, the second constraining structure is slidably combined with the first constraining structure.

3. The charging device of claim 2, wherein the first constraining structure is a constraint protrusion, the second constraining structure is a constraint slot, and the constraint protrusion slidably inserts into the constraint slot.

4. The charging device of claim 2, wherein the base further comprises a constraining plank whereon a constraint hole is formed, the first constraining structure is formed on the constraining plank, the supporter further comprises a constraining baffle accordingly, the constraining baffle can buckle the constraining hole when the supporter is combined with the first constraining structure via the second constraining structure, so as to constrain a movement of the supporter relative to the base.

5. The charging device of claim 4, wherein the constraining baffle is a resilient unit, and an end of the resilient unit buckles the constraining hole.

6. The charging device of claim 1, wherein the base further comprises a first restraining structure, the second connector comprises a second restraining structure, the second restraining structure is slidably combined with the first restraining structure.

7. The charging device of claim 6, wherein the first restraining structure is a restraint protrusion, the second restraining structure is a restraint slot, and the restraint protrusion slidably inserts into the restraint slot.

8. The charging device of claim 1, wherein the base further comprises a restraint hole formed on an inner wall of the accommodating structure, the second connector further comprises a restraining plank, an end of the restraining plank buckles the restraining hole in a resiliently oscillatory manner to restrain a movement of the second connector relative to the base.

9. The charging device of claim 1, further comprising:
   a fixing component detachably disposed between the first connector and the supporter, the fixing component fixing and constraining a movement of the first connector relative to the supporter.

10. The charging device of claim 9, wherein the first connector comprises a first engaging structure, the supporter comprises a second engaging structure, the fixing component slidably inserts into the first engaging structure and the second engaging structure.

11. The charging device of claim 10, wherein the fixing component is an engaging protrusion, the first engaging structure and the second engaging structure respectively are engaging slots, two ends of the engaging protrusion slidably insert into the engaging slots respectively.

12. The charging device of claim 9, wherein the fixing component comprises a resilient arm, the supporter further comprises a contacting portion, an end of the resilient arm buckles the contacting portion to fix and constrain a movement of the fixing component relative to the supporter.

13. The charging device of claim 1, wherein the supporter comprises a holding structure, a contour of the holding structure substantially corresponds to a shape of the portable mobile communication device.

14. The charging device of claim 1, wherein the base further comprises:

a first opening structure disposed on a side of the accommodating structure and adjacent to the supporter, the transmission cable piercing through the accommodating structure via the first opening structure; and a second opening structure disposed on the other side of the accommodating structure, the second connector being disposed on the second opening structure to be electrically connected to the external power supply device or the electronic datum processing device.

15. The charging device of claim 1, wherein the transmission module further comprises a magnetic component disposed on the first connector, the first connector utilizes the magnetic component to connect to a magnetic unit disposed on the connecting interface of the portable mobile communication device.

16. The charging device of claim 1, wherein the transmission module further comprises an auxiliary charging outputting connector, and the base further comprises:

an auxiliary charging inputting connector;

a battery container for containing a battery module;

a charging terminal, a part of the charging terminal being exposed out of a side of the battery container to be electrically connected to an electrode of the battery module; and a charging circuit board electrically connected to the auxiliary charging inputting connector and the charging terminal.

17. The charging device of claim 1, wherein an opening is formed on the supporter corresponding to the connecting interface of the portable mobile communication device, and the first connector of the transmission module can be fixed on the opening.

* * * * *